ered in the front and rear totalizers; 65
UNITED STATES PATENT OFFICE.

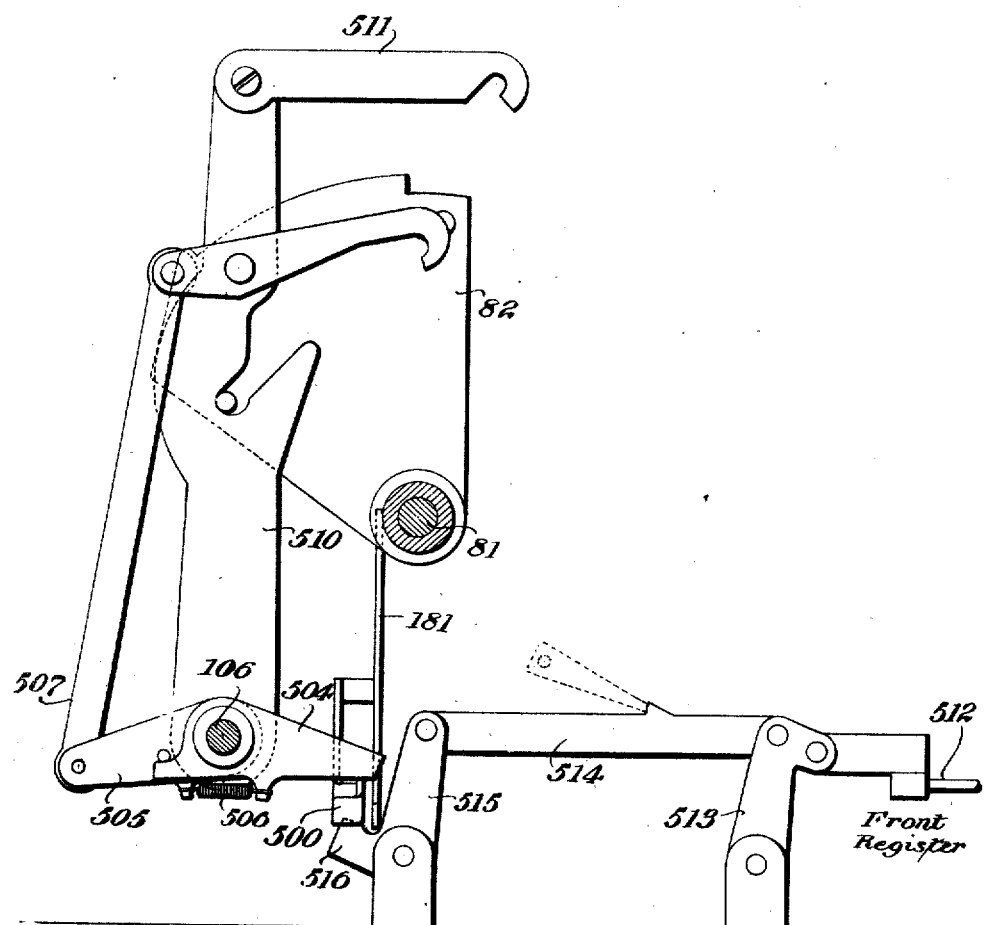

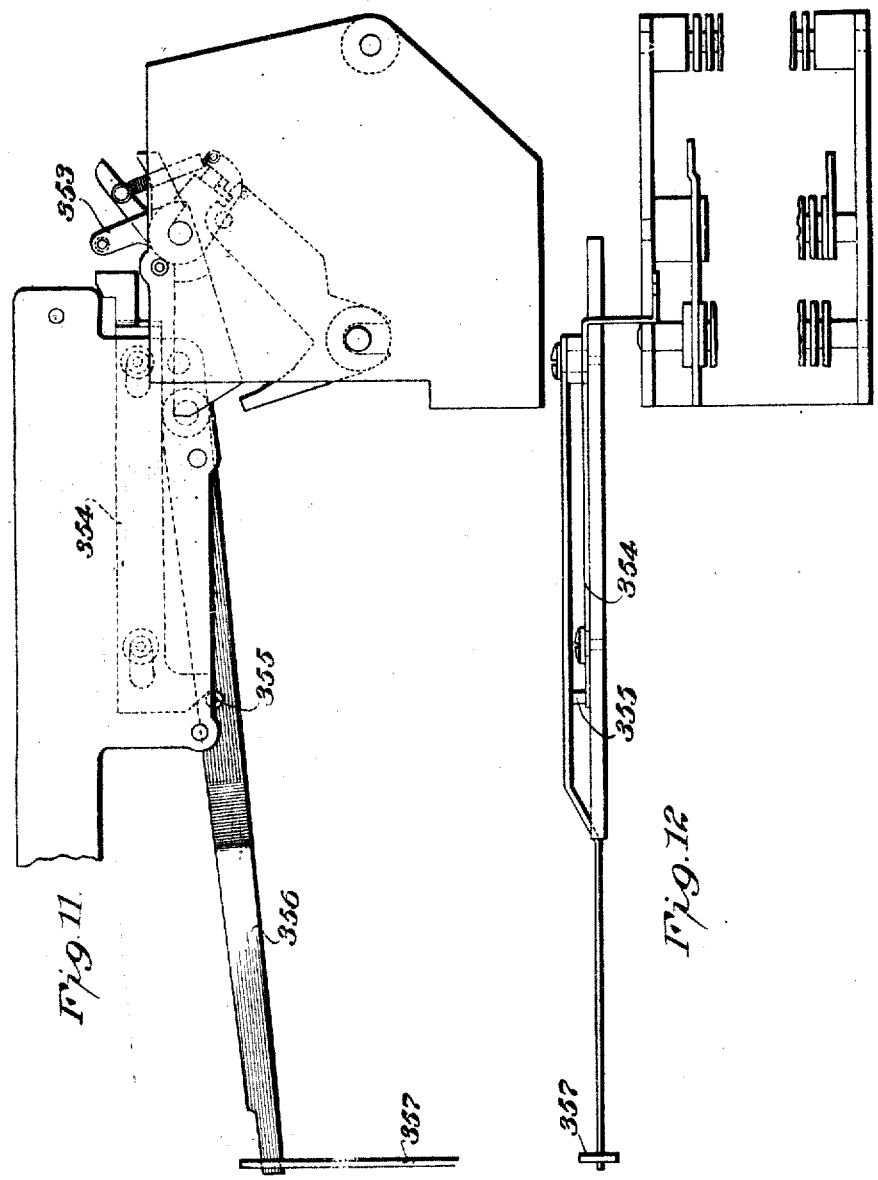

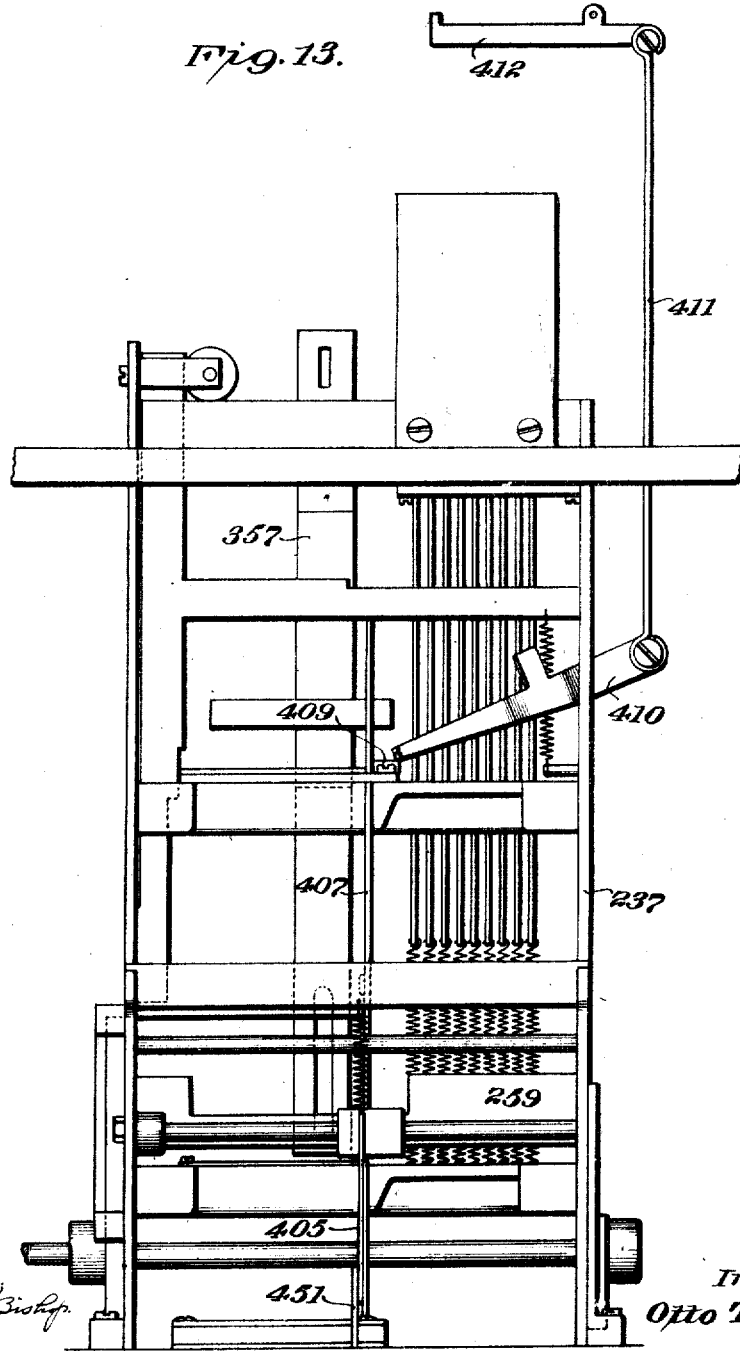

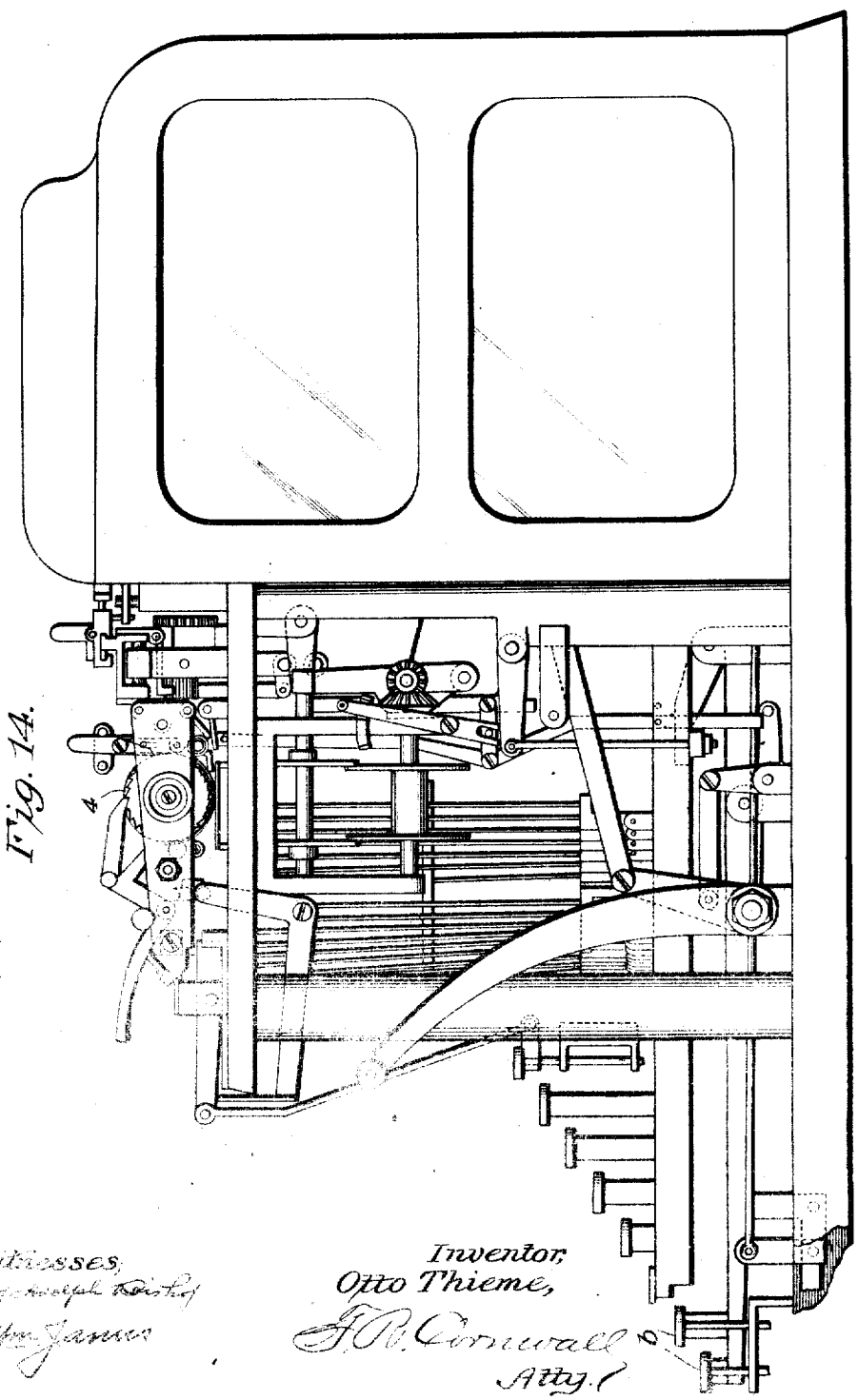

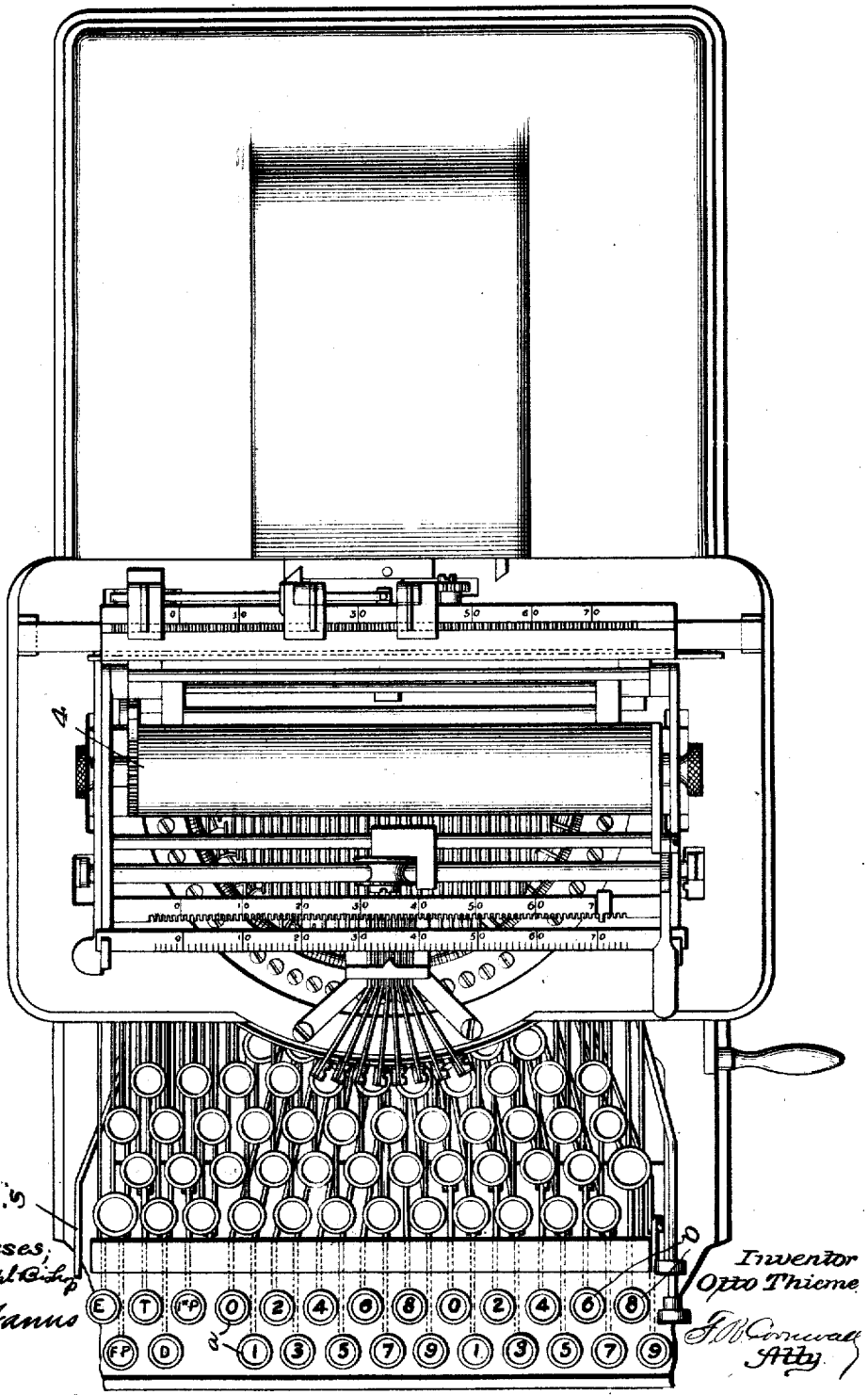

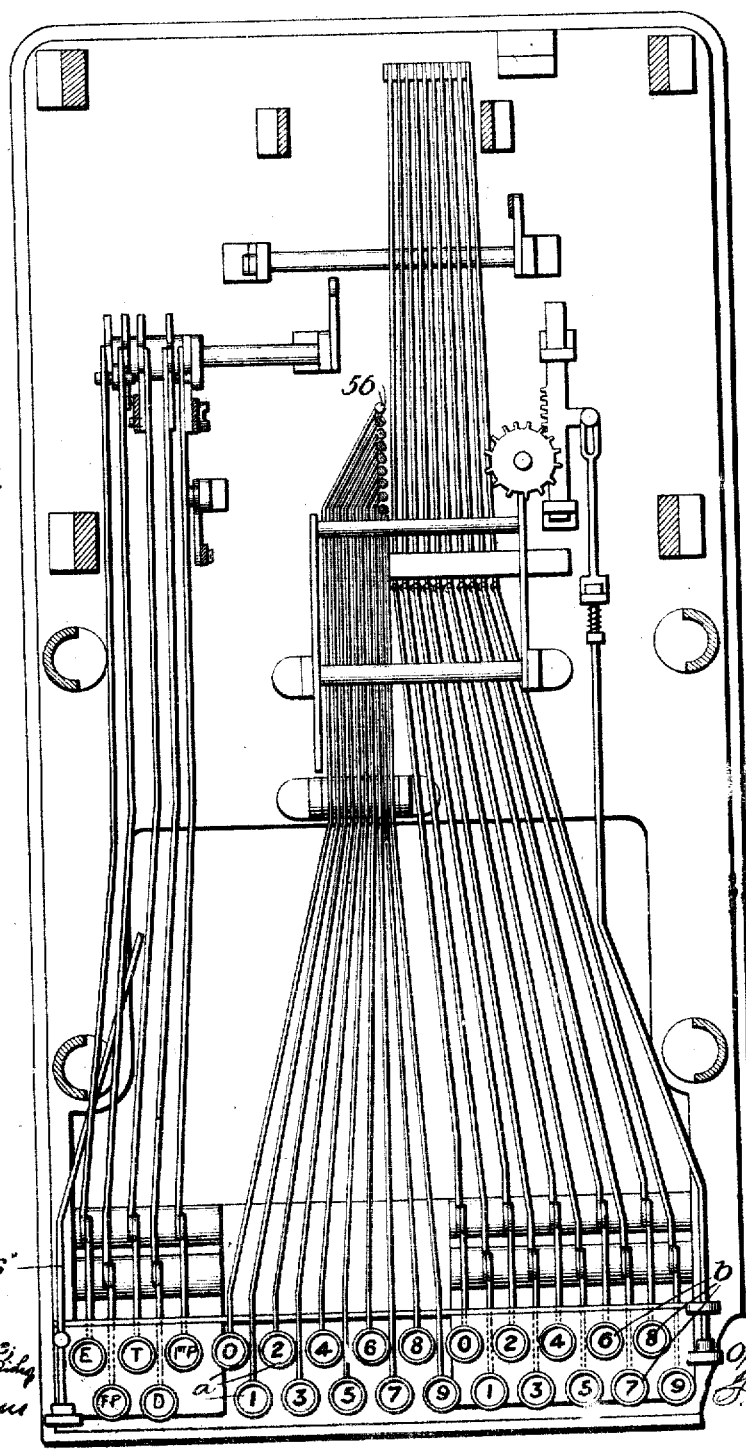

OTTO THIEME, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,321,260.  Specification of Letters Patent.  Patented Nov. 11, 1919.

Application filed August 19, 1913. Serial No. 785,523.

*To all whom it may concern:*

Be it known that I, OTTO THIEME, a citizen of the United States, residing at city of St. Louis, State of Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 4:
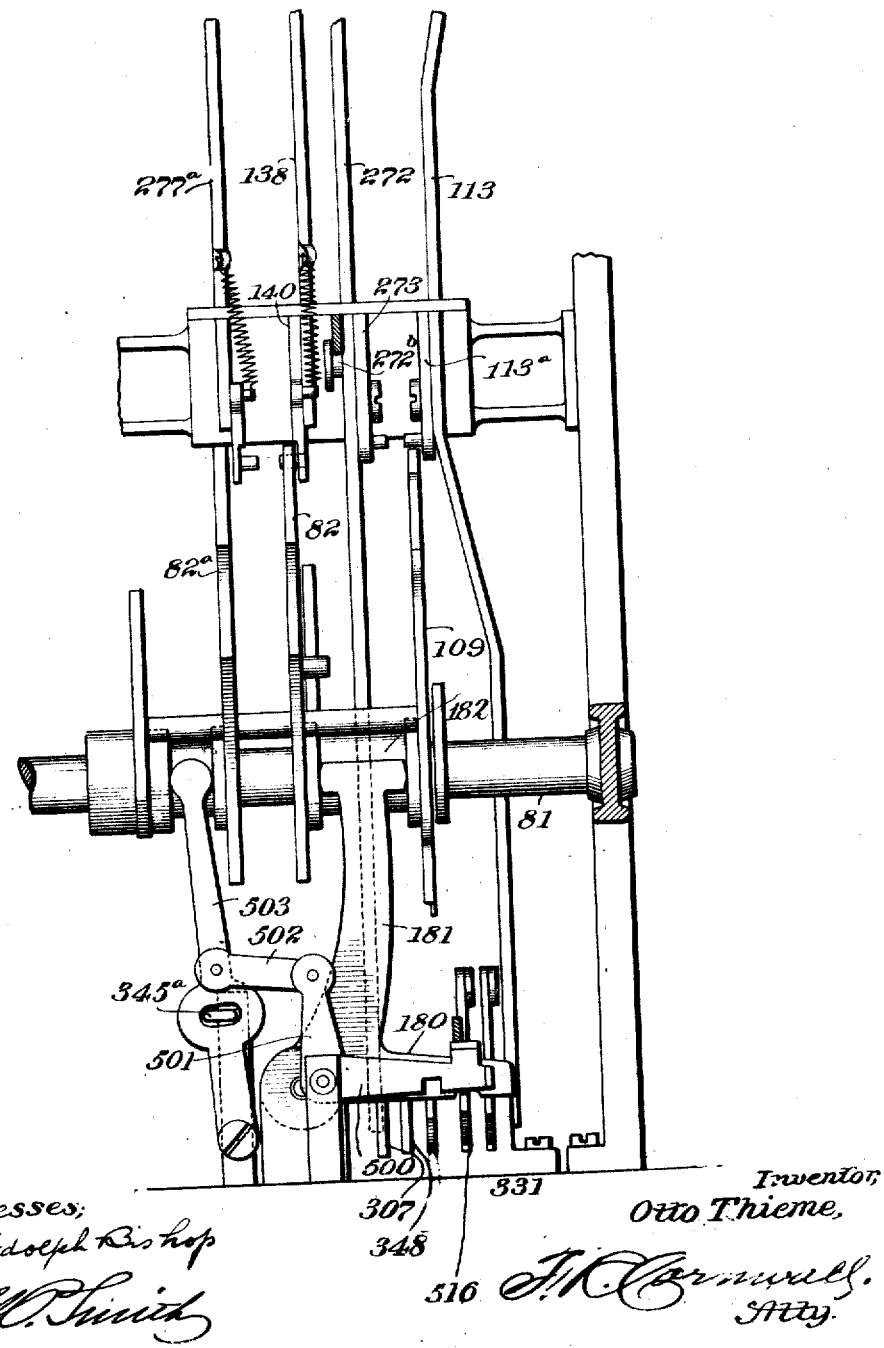
Fig. 4 is a rear elevational view of the result keys and their connections.

Fig. 4ª is a detail view of the mechanism employed in subtracting operations to automatically introduce "1" into the units column.

Fig. 4ᵇ is a modification of what is shown in Fig. 4ª.

Figure 5:
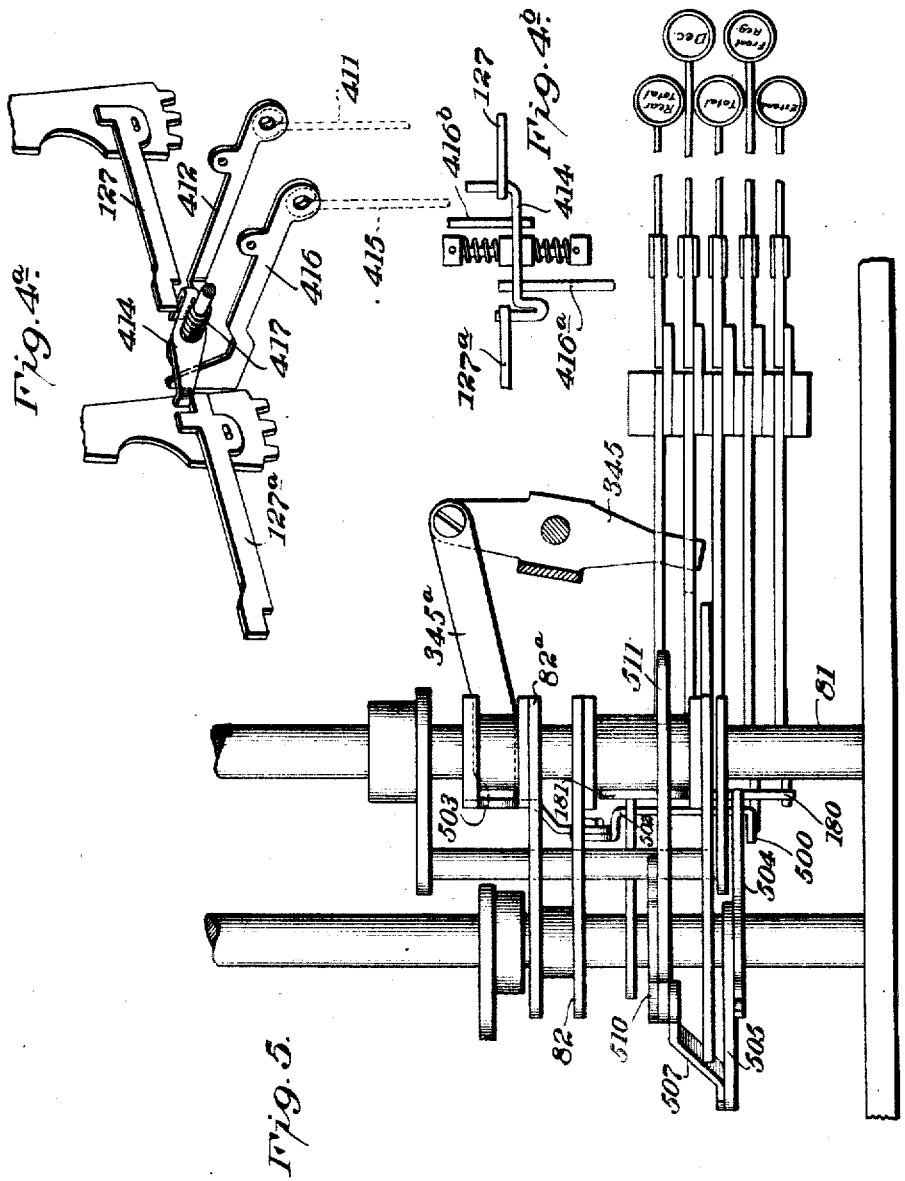

Fig. 5 is a top plan view of some of the result keys and their connections.

Figure 6:
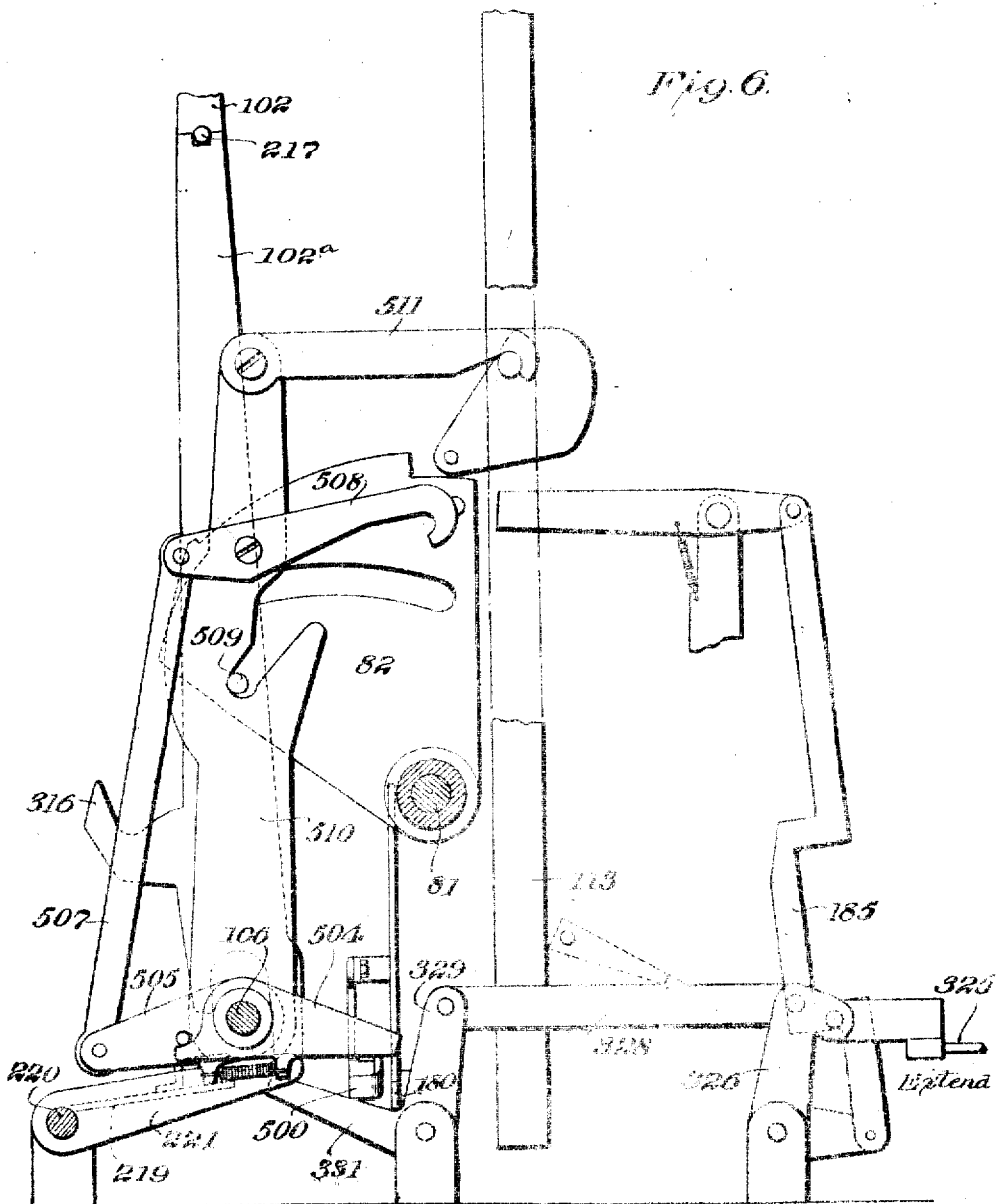

Fig. 6 is a diagrammatic view of the extension key and its connections.

Figure 7:
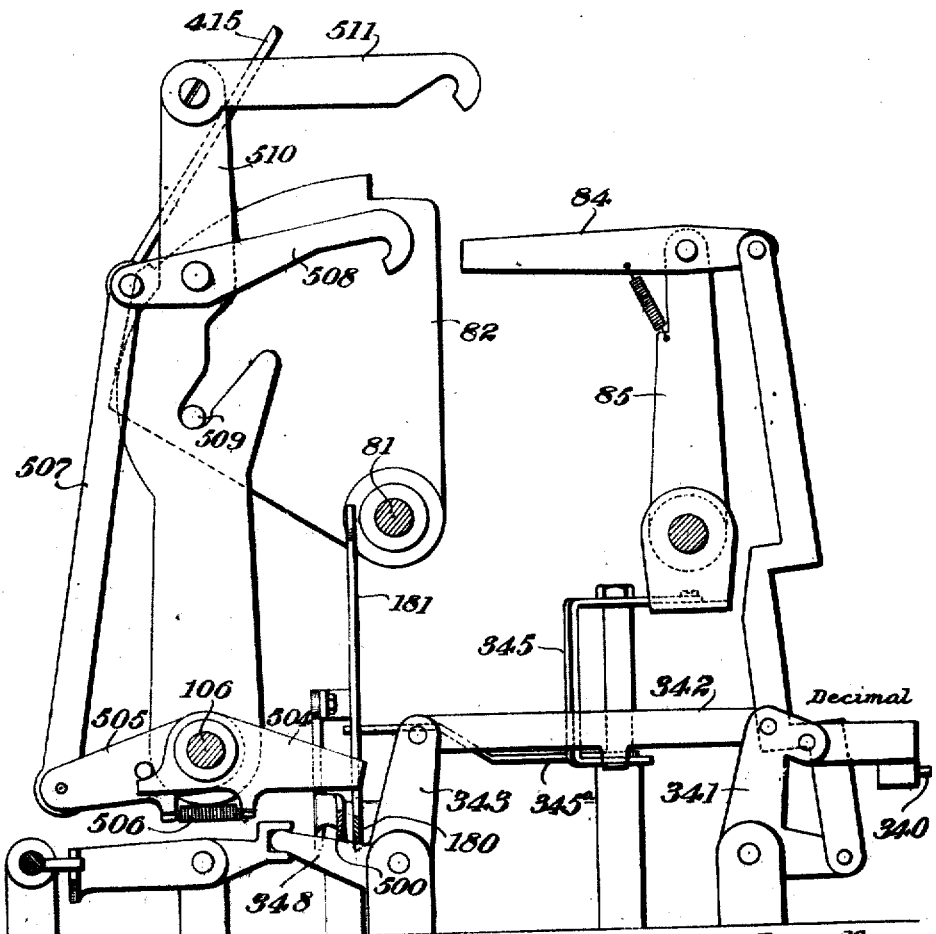

Fig. 7 is a diagrammatic view of the rear register key and its connections.

Figure 8:
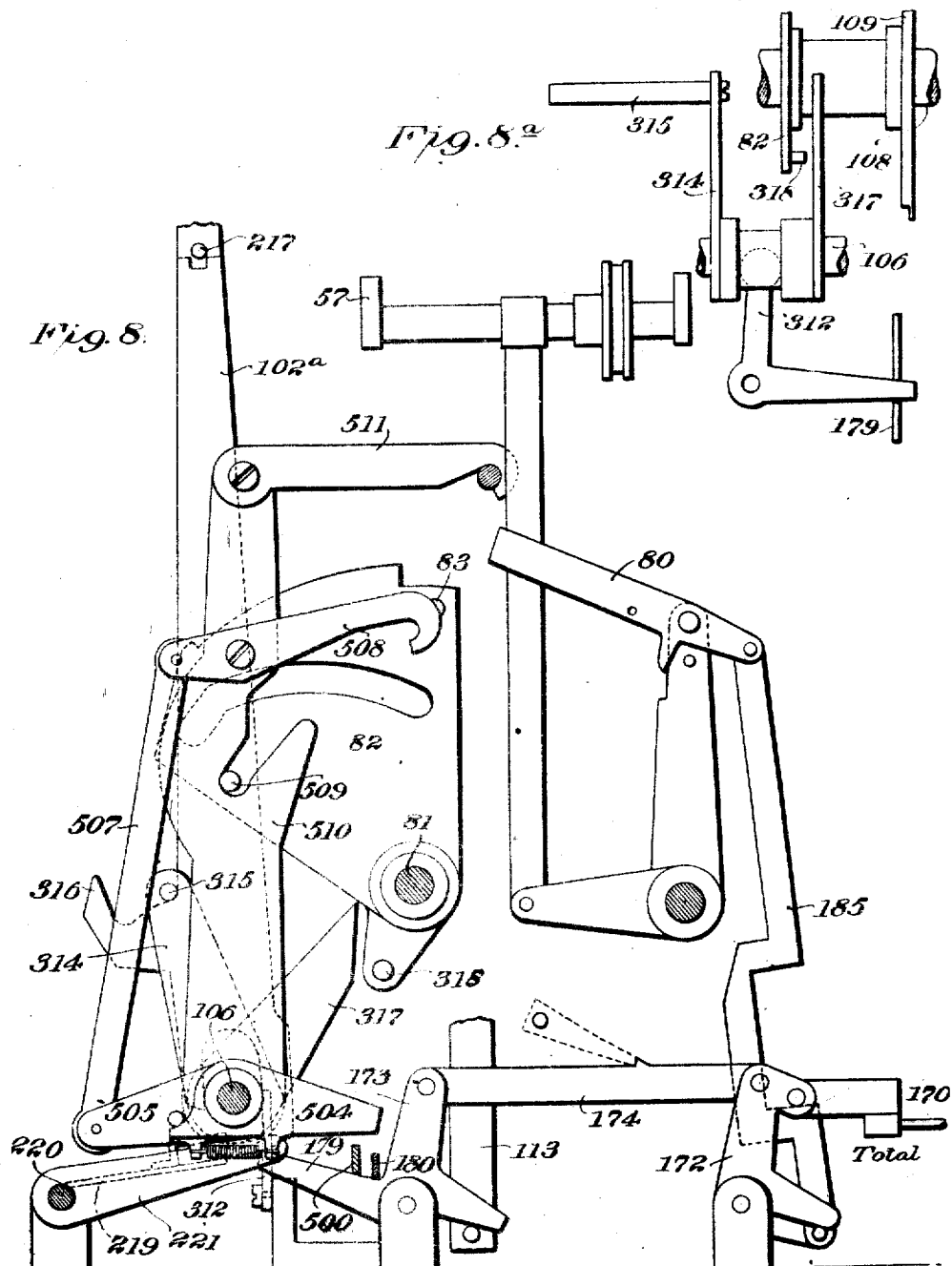

Fig. 8 is a diagrammatic view of the total key and its connections.

Fig. 8ª is a rear elevational view of the means operated by the total key for restoring the pendants.

Figure 9:
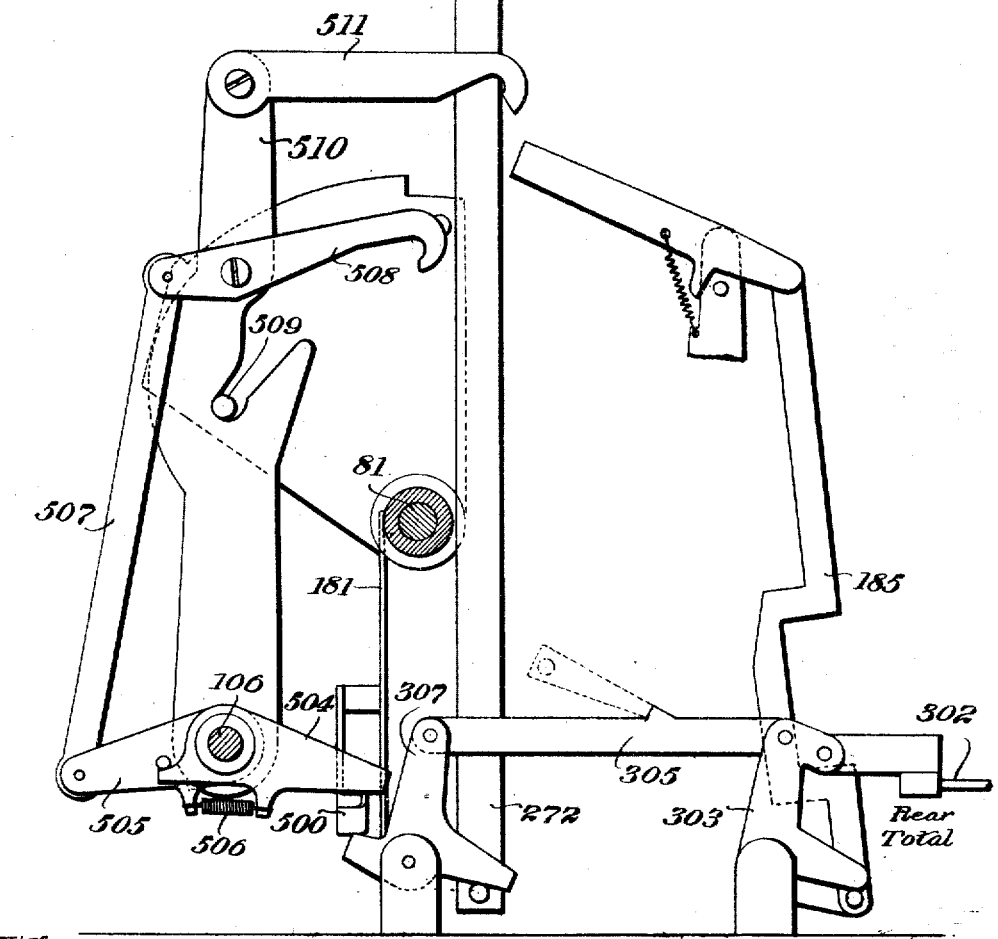

Fig. 9 is a diagrammatic view of the rear total key and its connections.

Fig. 10 is a diagrammatic view of the front register key and its connections.

Fig. 11 is a side elevational view of the non-print mechanism.

Fig. 12 is a plan view of certain parts shown in Fig. 11.

Fig. 13 is a rear view of the subtracting mechanism.

Fig. 14 is a side elevational view of the complete machine.

Fig. 15 is a top plan view of the same.

Fig. 16 is a horizontal sectional view taken above the key bars.

This invention relates to a new and useful improvement in calculating machines and is designed particularly as an improvement upon the combined adding and typewriting machine disclosed in French patent to Hubert Hopkins, No. 383,719.

My present invention contemplates means whereby numbers can be simultaneously registered in the front and rear totalizers; simultaneously subtracted from both of said totalizers, which latter operation involves the automatic introduction of "1" into the units wheels of each register; and the control of the front and rear totalizers whereby either may be independently actuated by the racks at the will of the operator, either in additive or subtractive operations.

In the drawings, I have shown such portions of the machine of the French patent as will enable a clear understanding of my present invention, and I rely upon the disclosure of such French patent for a fuller understanding of the machine therein disclosed and parts of which might be herein referred to, but which may not be fully illustrated or specifically described.

In the machine of the French patent referred to, there are ten digit keys $a$ and ten multiplier keys $b$. The ends of the digit keys lie under the ends of the vertical bars 56 (see Figs. 1 and 16), which, when elevated, will raise pins 63 in a pin carriage 57, said carriage being advanced step by step leftwardly as the keys are successively operated. When the carriage has been advanced and the pins 63 therein positioned to represent a number, the operation of the main operating shaft 106 will, through suitable appropriate cams 82—109, lift the carriage and its elevated pins 63 to position pins 93 in a stationary field of stops and place said pins 93 in control of rack bars 100 which are provided with shoulders 101 to engage said elevated pins. These rack bars 100 carry type at their forward ends which coöperate with printing hammers, whereby a record may be made of the various items on a sheet of paper carried by the platen 4, such as amounts registered in the front and rear totalizers and the totals thereof, the multiplicands set up in the machine, the minuend and subtrahend, remainders, etc. 119 indicates the wheels of the forward totalizers, of which there may be several groups, and 268 indicates the wheels of the rear totalizer, which in the operation of multiplication are stepped leftwardly one higher space at the end of every operation of each multiplier key.

I shall not describe the carrying mechanism, or the multiplying mechanism here, as the same are fully disclosed in the French patent referred to.

Figure 1:
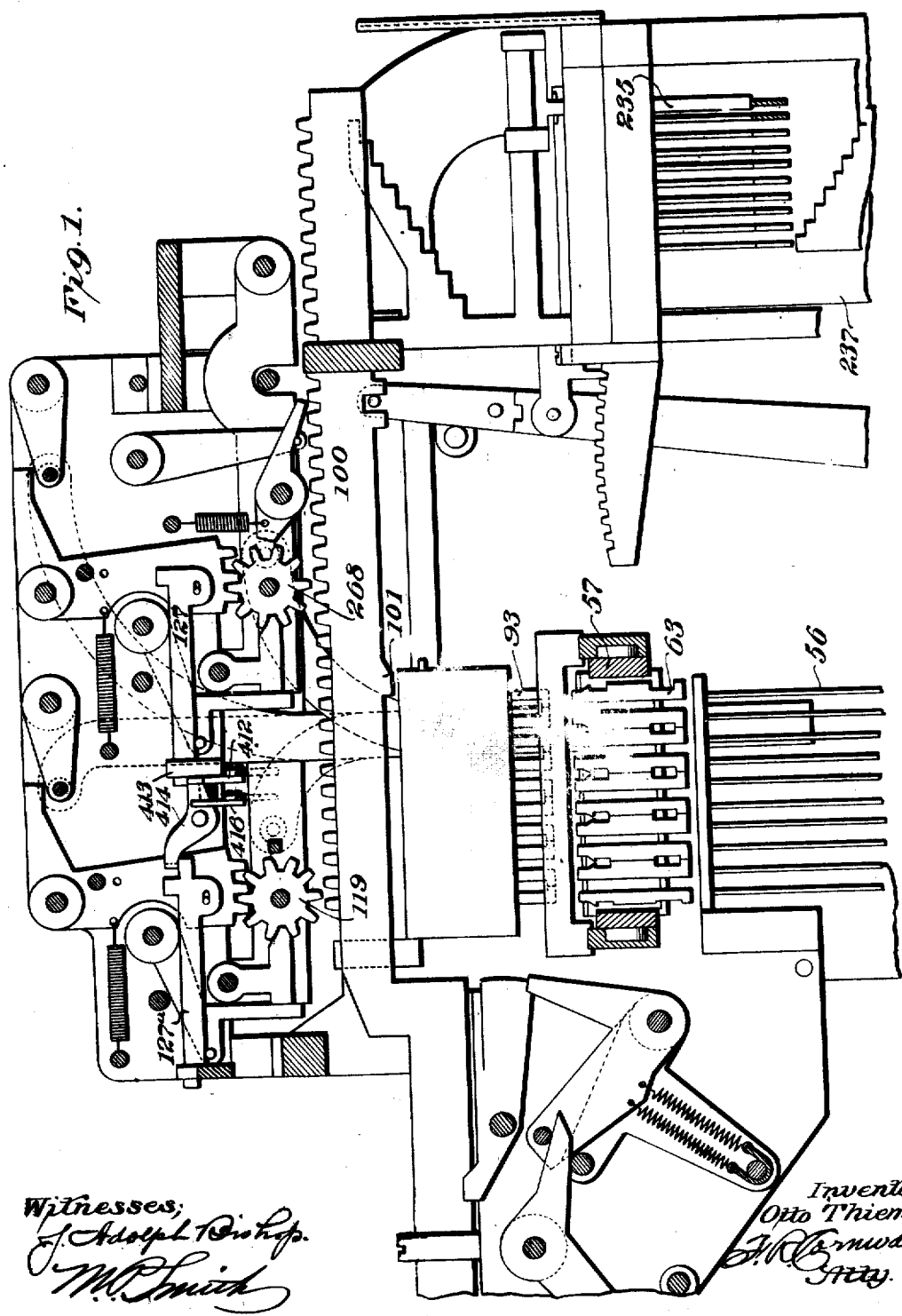
Figure 1 is a vertical sectional view through the upper rear portion of my improved calculating machine.
Figure 3:
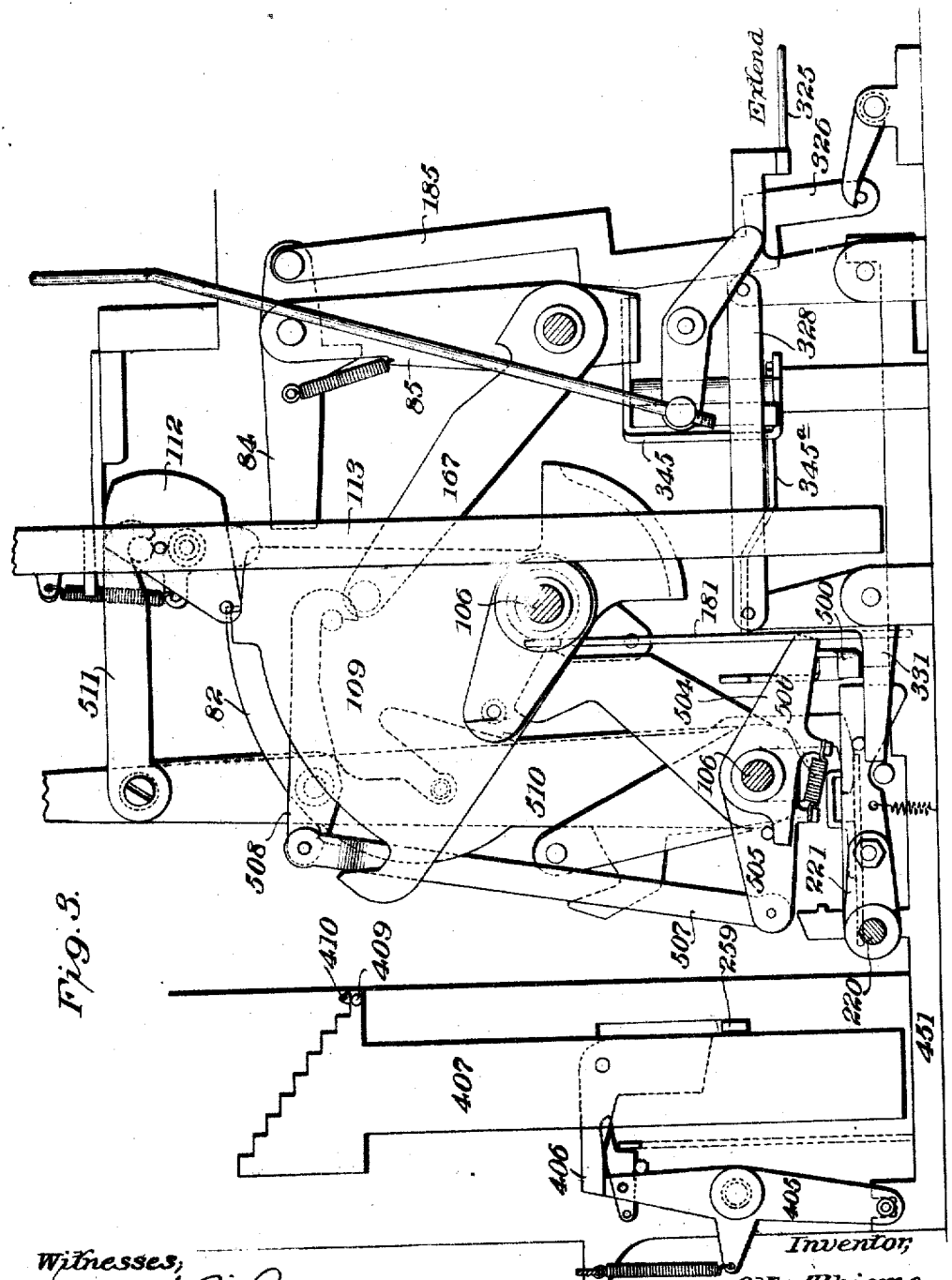
Fig. 3 is a side elevational view as seen from the left hand side of the lower rear portion of said calculating machine.

Referring now to Figs. 1, 3 and 4, it will be seen that the rod 113, which is connected to the frame 49 in which forward totalizer wheels 119 are mounted, is controlled by a cam 109 coöperating with a cam face tappet 112 mounted on the bar 113 in the same manner as disclosed in said French patent; also that the cam 82, which is connected to the cam 109 by means of a collar 182 slidingly mounted on the main operating shaft 81, also coöperates with a bell crank lever 180—181 in the manner described in said French patent (see Figs. 4 and 5), the cam 82 being employed to coöperate with the cam face tappet 140 mounted on the end of the rod 138 to re-set the carrying segments after the same have been operated. Normally, when the machine of the French patent is operated, these cams 82—109 are located in the position shown in Fig. 4 wherein they control bars 113 and 138 to register numbers in the forward totalizer into a selected group of forward totalizer wheels and also re-set the carrying mechanism which coöperates with the forward totalizers.

In the French patent, aforesaid, the depression of the D. or decimal key, in addition to other functions which it performs, would shift the cams 82—109 from their first position, here shown in Fig. 4, to their third position, in which cam 109 would be placed in control of a tappet 273 on a bar 272 connected to the frame in which the rear totalizer wheels were mounted, so as to bring the rear totalizer wheels into mesh with the racks without disturbing the position of the forward totalizer wheels. The cam 82 would also be shifted to its third position and put in control of the tappet on a bar corresponding to the bar 138 whereby the carrying mechanism for the rear totalizer wheels would be re-set.

The second and neutral position of the cams 82—109 is that position in which the cams may be rocked when located between the pins on tappets 112—273, etc., as when the T. or total key is depressed.

My present invention contemplates the addition of a third cam which I will designate as 82ª and which is like the cam 82 in many essentials with the exception that it is moved longitudinally of the shaft 81 independently of the cam 109, with which it has no connection, and by independent means.

Referring now to Fig. 6, which is an isolated view of the parts controlled by the E. or extension key. I will state that the purpose of this key is to cause a number set up on the keyboard by depressing the digit keys, to be set up or represented by the pendants 235 (see Figs. 1 and 2) so that said number can be either used as a multiplicand or a subtrahend. When the E. key is depressed in this present instance, it moves the cams 82—109 to their second or neutral position so that the number to be used as a multiplicand or subtrahend is not introduced into either the front or rear totalizer wheels and said extension key also shifts the cam 82ª laterally beyond control of the pin on the tappet of bar 272ª or to the position shown in full lines in Fig. 4. The extension key is connected by a bell crank lever to a rod 325, in turn connected to a lever 326, but said lever in this instance is not provided with a forward extension to depress a bar 185 and thereby disable the carriage lifting mechanism, as it is desired that said carriage lifting mechanism shall be operated to control the racks as in the normal operation of the machine. The lever 326 is connected by a link 328 to a bell crank lever 329 which, in this instance is not provided with a forward extension to depress the bar 113 as it is not desired to introduce a number set up on the keyboard and extended back into the pendants, into the forward totalizer wheels 119; nor is the rearward extension 331 of this lever notched under the member 180 of the bell crank as in the French patent, but said rearward extension engages said member 180 and shifts the cams 82 and 109 to their central or neutral position, as before described. The lever 331 also engages a pin on the end of an arm 221 so as to rock the shaft 220 and through the medium of the plate 219 lift the supplemental bars 102ª so that the notches in their upper ends will engage the pins 217 on the main levers 102, which latter are connected to the racks whereby the supplemental bars 102ª partake of the movement of the racks so as to locate the pendants 235 in the manner contemplated by said French patent.

In my present application there is a lever 500 whose end lies over the extension 331, said lever being in the form of a bell crank lever (see Fig. 4) pivoted on a post mounted in the base of the machine and the upward extension 501 is connected by a link 502 to a lever 503 whose upper end engages the hub of cam 82ª. In this manner, when the extension key is depressed, the cam 82ª is shifted beyond control of the rear totalizer carrying mechanism. Mounted on shaft 106 is a two part lever 504—505, the portion 504 lying over the lever 500 so that when said lever 500 is raised, it will, through a spring 506 move a link 507 downwardly so as to elevate the forward hooked end of a lever 508 out of the path of a pin 509 on cam 82. The purpose of making this lever 504—505 in two parts, which are connected by a spring, is to enable the part 504 to be raised independently of the part 505 in certain operations of the machine where the part 505 is locked against movement, and also, in the operation of the machine, when the pin 509 engages the hooked end of lever 508 to pull the same forwardly, the spring 506 will yield to permit this slight forward movement, although the forward end 504 of the lever is prevented from moving downwardly. The hook lever 508, before referred to, is pivotally mounted upon an arm 510, which arm is supported by the shaft 106 and carried at its upper end a cam bar 511 having a hooked forward end, said forward end and cam face on said bar coöperating with the pin 272$^b$ on the bar 272 (see Figs. 3 and 4). Thus, in the normal operation of the machine, when the cam 82 rocks forward, the bar 272 will be depressed simultaneously with the depression of the bar 113 and the rear totalizer wheels will be engaged with the racks 100 and disengaged therefrom at the same time that the forward totalizer wheels are engaged and disengaged from the racks, whereby a number set up on the keyboard through the digit keys will be simultaneously introduced into both the forward and rear totalizers.

Thus the cam 82 is shifted to prevent a number, being extended, from being introduced into the forward totalizer wheels, and also to prevent said number being introduced into the rear totalizer wheels when the E. or extension key is depressed, by the hook lever 508 which has its forward end elevated out of the path of the pin 509 on the cam 82.

In further describing the operation of the so-called "result" keys, I shall take them up in the order that they occur in the machine, having commenced with the parts controlled by the E. or extension key which are located at the extreme left hand side of the machine.

The next key in order is the "front register" key. The key bearing the designation "Front reg." controls the parts next adjacent those controlled by the E. or extension key which are best shown in Fig. 10. Briefly stated, the function of the front register key is to position the cam 82$^a$ so that a number set up on the digit keys will not be introduced into the rear register but only introduced into the front register. The depression of the front register key through its connected rod 512, lever 513, link 514, and bell crank 515, raises, by the rear extension 516 of the bell crank lever, the member 500 of the bell crank which shifts the cam 82$^a$ to its idle or non-controlling position.

The rear extension 516 is notched so that the member 180 of the bell crank 180—181 will not be moved and consequently the cams 82—109 are left in their normal or first position. The operation of the bell crank 500—501 will also raise the hook lever 508, as just above described, so that the rear totalizer wheels will not be brought into mesh with the racks.

The next in order of position from the left hand side of the machine is the T. or total key, which, like the T. or total key of the French patent has the function of shifting the cams 82—109 to their second or neutral position, but in the present instance, the T. or total key performs additional functions.

Referring to Fig. 8, it will be seen that the rod 170 connected to the T. key is also connected to the bell crank lever 172 and that this lever will, when operated, depress the rod 185, lifting the tappet 84 out of the path of the pin 83 on the cam 82, thus disabling the carriage lifting mechanism when the T. or total key is depressed. The bell crank 172 is connected by the link 174 to the bell crank 173 having a forward extension to engage a pin on the lower end of rod 113 so as to engage the forward totalizer wheels with the racks as is ordinary in total-taking operations. The T. or total key in this instance, however, possesses the additional function, through the medium of its rear extension 179, of rocking the shaft 220 so as to lift the supplemental levers 102$^a$ to their intermediate position, but not so high as to engage the pins 217.

Figure 2:
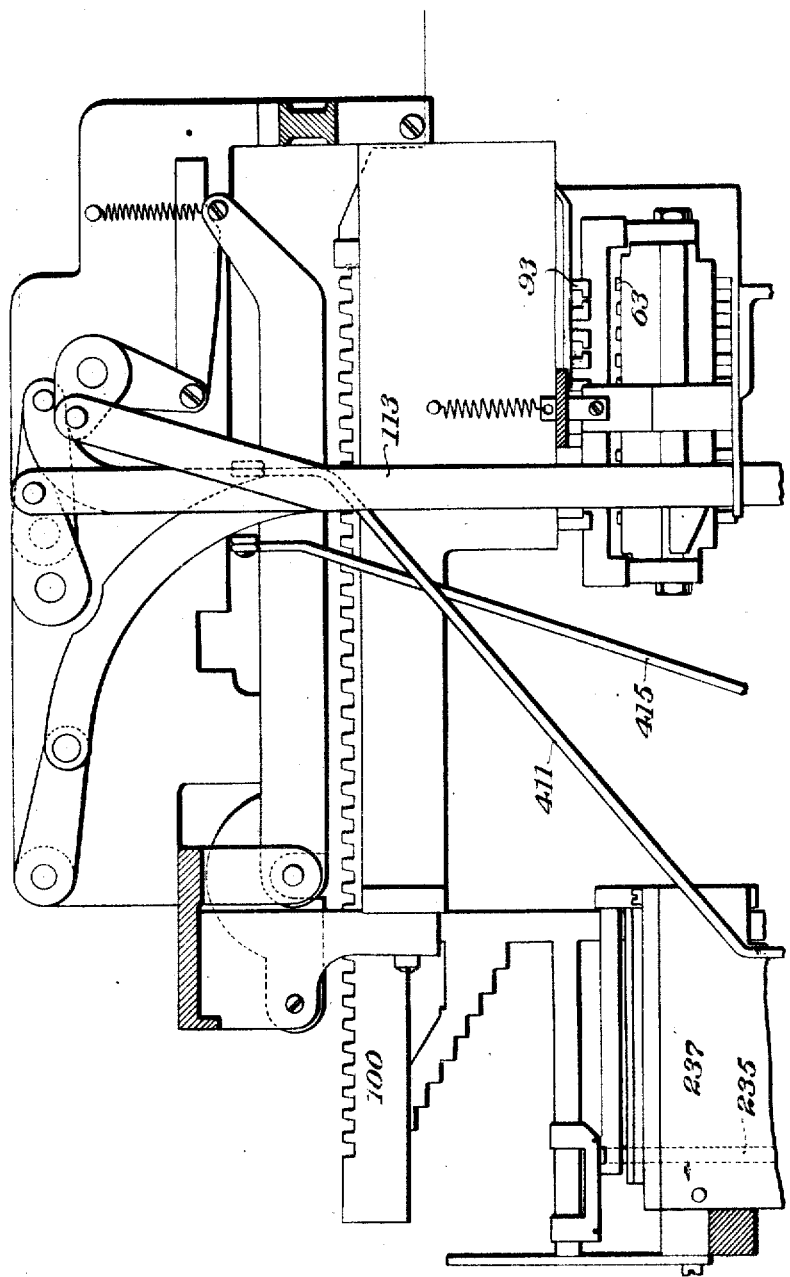
Fig. 2 is a side elevational view as seen from the left hand side of the upper rear portion of said machine.

When the rearward extension 179 rises, it will also rock the bell crank 500—501 and shift the cam 82$^a$ out of control of the rear totalizers, at the same time rock a bell crank lever 312 (see Fig. 8$^a$) so as to shift cam 317 slidingly mounted on shaft 106 into the path of movement of the pin 318 on a downward extension of cam 82 whereby the arm 314 will be rocked and the restoring bar 315 will engage the extensions 316 on the supplemental levers 102$^a$. In this manner, the pendants 235, see Figs. 1 and 2, are restored to normal or zero position whenever the total key is depressed and the machine operated. The restoration of the pendants in the machine of the French patent referred to, follows the depression of the P. or product key, but as the pendants in the present machine also represent subtrahends as well as multiplicands, I prefer to restore them following the operation of the total key. It is obvious that the P. or product key could also be used in the same manner to restore the pendants, as described in said French patent, but in the present instance the P. or product key does not possess this function.

It will be observed from the operation above described that the depression of the total key will cause the number registered in a selected group of forward totalizer wheels to be yielded as a total, whether this number represents the accumulation of a series of products, remainders, or a total of a series of items directly introduced into the front totalizer wheels. If a number is represented in the rear totalizer wheels, it will not be disturbed by the operation of the machine after depression of the T. or total key; but the pendants, formerly representing a multiplicand or subtrahend will be restored.

The next result key and its associated parts to be described perform practically the same functions of the D. or decimal key of the machine of the French patent in that when this key is depressed and the machine operated, a number set up on the keyboard will be introduced into the rear totalizer to the exclusion of the forward totalizer. The rod 340 (see Fig. 7) which is connected to this key is also connected to lever 341 in turn connected by link 342 to the bell crank lever 343 having a rearward extension 348 lying under the member 180 of the bell crank lever and the member 500 of the bell crank lever 500—501 so as to shift the cam 82ª to its idle position at the time that the cams 82—109 are shifted to their third position. The hooked end of lever 508 is also elevated out of the path of the pin 509.

By referring to Figs. 5 and 7, it will be observed that the bar 342 connected to the D. key is provided with a downwardly extending lug located at about midway its length which coöperates with the lower and outwardly extending end of a pivoted bail member 345, which bail member is utilized to slide the arm 107ª which controls the release of the printing hammers, so as to cause the same to remain in operative relation with its operating cam 82 substantially in the manner set forth in said French patent. This bail member 345 (see Fig. 3) also slides the arm 85 carrying the tappet 84 so as to maintain operative relation between cam 82 and said tappet when the cams are moved to their third position on the depression of the D. key.

The bail member 345 has a bar 345ª pivotally connected to its inner end, which bar is mounted in a slot in the upper end of the post, said post being mounted in the base of the machine and forming also a support for the pivoted end of lever 503, see Fig. 4. The rear end of this bar 345ª is provided with a cam face shown in dotted lines in Fig. 5 as a compound curved face, which cam face coöperates with a slot in the shifting lever 503 which controls the cam 82ª. The purpose of this cam bar is to hold cam 82ª in its shifted position shown in Fig. 4 when the bar 345ª is moved rearwardly and relieve the bell crank 500—501 from strain.

The next series of parts under control of a result key are similar in some respects to those controlled by the P. or product key of the machine of the French patent. In this instance, as the number represented in the rear totalizer may be a product resulting from multiplying operations of the machine, a minuend, or a remainder, I prefer to designate the key controlling the parts about to be described as "rear total" instead of P. or product key of the French patent, to distinguish it from the usual T. or total key operated to obtain a total from the forward totalizers. This rear total key is connected to a rod 302 (see Fig. 9) in turn connected to a bell crank lever 303 which has a forward extension to depress the bar 185 and disable the carriage lifting mechanism. Link 305 connects 303 with bell crank lever 307 having a forward extension to engage a pin on the lower end of the bar 272 whereby the rear totalizer wheels are brought into engagement with the racks. This bell crank 307 also has a rearward extension to rock the bell crank 500—501 so as to move the cam 82ª to idle position and also to lift the hooked end of the lever 508 out of the path of the pin 509. It will be observed that when the rear total key is depressed and the machine operated, that the number represented by the pendants will not be canceled, but will still stand and the pendants remain in their former or set position. This is desirable in some instances for the reason that a number represented by the pendants as a multiplicand can be repeatedly multiplied by multipliers containing different digits without necessitating the repeated setting up of the same multiplicand. A number represented in the rear totalizer wheels when the rear total key is depressed, will be transferred into the forward totalizer wheels and a record made thereof. The T. or total key for taking a total from the forward totalizers and the rear total key for taking a total from the rear totalizer will rise at the end of the forward stroke of the operating shaft and said totalizer wheels will stand clear at the end of total taking operations. If said keys are held depressed on the return stroke of the shaft, the total, or number previously represented therein, will be introduced into said wheels.

From the above, it will be seen that in the normal operation of this present machine, a number set up by the digit keys will be simultaneously introduced into the front and rear totalizer wheels; that a total can be taken from either the front or rear totalizer wheels to the exclusion of the other by depressing the T. key and taking the total represented in the front totalizer wheels, or by depressing the rear total key to take the total represented in the rear totalizer wheels; that a number can be registered into a selected group of front totalizer wheels to the exclusion of the rear totalizer by depressing the front register key; or a number can be introduced into the rear totalizer wheels to the exclusion of the front totalizer wheels by depressing the D. or decimal key; or a number can be simultaneously subtracted from both the front and rear totalizers, or from either one of said totalizers at the will of the operator.

As the machine in normal operations will simultaneously introduce numbers into both the front and rear totalizers, it follows that in operations of subtraction a number appearing in either forward or rear totalizer wheels will be represented as a minuend, and a subtrahend subtracted therefrom will reduce the numbers in both the front and rear totalizers unless some means is provided to prevent this.

Subtraction as carried out in the machine shown in the accompanying drawings is substantially the same as that disclosed in an application filed by Hubert Hopkins May 11, 1908, Serial Number 432,166, and an application filed March 29, 1912, Serial Number 687,200, in which a subtraction plate 407 arranged at the rear of the machine (see Figs. 3 and 13) is employed. This subtraction plate is controlled by a subtraction key bar 451 having a button at its forward extremity, not shown, whereby the same may be operated. The bar 451 is connected to a lever 405, the upper end of which is normally under a pivoted lever 406 carried by the subtraction plate. The manner of operating this subtraction plate forms no part of my present invention, and I will not, therefore, further describe the same except to mention that when the subtraction plate is lifted a pin 409 carried at its upper end operates a lever 410 connected by the rod 411 to a lever 412. This lever 412 is pivoted to a cross bar 413 in the upper frame plate of the machine (see Fig. 1), and whenever the subtraction plate is raised, will trip the latch bar 127 in the units column of the rear totalizer wheels 268, adding "1" in the units totalizer wheel in the operation of subtraction. As numbers are simultaneously introduced into the wheels 119 and 268 in the normal operation of the present machine, it is desired that the ordinary operation of subtraction shall simultaneously reduce the numbers represented by both sets of wheels 119 and 268. In other words, both front and rear totalizers become minuend registers in the operation of subtraction and the subtrahend, set upon the pendants 235, will be subtracted therefrom leaving a remainder in both sets of wheels.

In order that "1" may be automatically added in the units column of the wheels 119, I arrange a lever 414 (see Fig. 4ª), one end of which is interposed between the lever 412 and latch bar 127. The opposite end of this lever lies over a rearwardly projecting finger of the latch bar 127ª in the units column of the totalizer wheels 119. Thus, whenever the forward end of the latch bar 127 is raised, the rear end of the latch bar 127ª is depressed, both latch bars being thus released so as to add "1" in the units columns of the wheels 119 and 268.

In certain operations of the machine, it may be desirable to subtract in wheels 268 to the exclusion of the wheels 119 and therefore, under such conditions, it would be improper to add "1" in the units column of the wheels 119.

As the operation of the D. key will shift the cams 82—109 to their third position, at the same time lifting the hooked end of lever 508, I utilize this movement to disable lever 414 with respect to the latch bar 127ª. A rod 415 is connected to the rear end of lever 508 and to a lever 416 pivoted upon a post extending from the cross bar 413. The end of this lever 416 is provided with a cam face which engages the lever 414. Lever 414 is slidably mounted on its fulcrum shaft and is held against a collar on said shaft by means of a compression spring 417. Thus when the lever 416 is operated, the lever 414 is slid longitudinally its shaft, which movement disengages its end from the latch bar 127ª but does not remove the opposite end of said lever from between the latch bar 127 and the lever 412. Thus, if it is desired at any time to subtract from a number represented in the wheels 268, the D. key may be depressed and then the subtraction key operated.

In Fig. 4ᵇ, I have shown a modified form of lever 414 which is capable of being moved in opposite directions for the purpose of selectively adding "1" in the units column of the wheels 119 or 268 depending upon which totalizer contains the minuend to be subtracted from. This modified form of lever numbered 414 is provided with extensions at its ends and springs on each side thereof whereby it normally coöperates with both latch bars 127 and 127ª. If the lever 414 is moved downwardly, as by a lever similar to 416, its left hand extension will be disengaged from the latch bar 127ª and its right hand extension remain in engagement with the latch bar 127, whereas, if said lever is moved upwardly, its right hand extension will be disengaged from the latch bar 127 and its left hand extension remain in engagement with the latch bar 127ª.

The means for moving the lever 414 upwardly is preferably connected to the front register key and may be in the form of the lever 416, which will be oppositely disposed to the lever shown in Fig. 4. I have shown a lever 416ª for moving the lever 414 downwardly, and a lever 416ᵇ for moving the same upwardly.

In Figs. 11 and 12, I have shown a novel means of operating the non-print mechanism which becomes effective when any of the multiplier plates or the subtraction plate is operated in the operations of multiplication and subtraction. Multiplication as carried on in the present machine is the same as that disclosed in the French patent in which the tens and units partial products are added together in the wheels 268. Subtraction is accomplished by adding the complement of the subtrahend to the minuend and introducing "1" into the units column of the minuend register. In both of these operations of multiplication and subtraction, the plates are lifted by a bar 259 operating in slots in the side frames 237. Said bar will also permit a bar 357 to rise, which bar is connected at its upper end to a lever 356 employed in the machine of the French patent for coöperating with stop pins of the decimal rack bar. I utilize this lever 356 in the present instance to operate the non-print mechanism by providing said lever with a projection 355 (see Fig. 11), coöperating with a cam face of a sliding bar 354, which sliding bar at its forward end is adapted to rock the lever 353. When the lever 353 is rocked forward in the full line position shown in Fig. 11, the bail member controlled thereby will engage notches in the pawls which control the printing hammers and prevent their operation as fully set forth and described in application No. 687,200.

As the bar 357 is lifted every time the bar 259 is raised to operate the subtraction or a selected multiplier plate, it follows that the printing mechanism will be contemporaneously disabled.

What I claim is:

1. In a machine of the character described, the combination of two sets of totalizer wheels, actuating devices therefor, cams for placing either one or both of said sets of totalizer wheels under control of said actuating devices, means for shifting said cams to effect such selective controlling position, carrying mechanism, and means whereby said cams coöperate with the proper carrying mechanism in their shifted position.

2. In a machine of the character described, the combination of two sets of totalizer wheels into which numbers may be simultaneously or separately introduced to represent minuends of the same or different numbers, devices which are simultaneously positioned to represent a subtrahend composed of one or more digits, and means for placing said devices in control of either one or both sets of totalizer wheels whereby the number represented by the position of said devices will be subtracted from a set or sets of minuend representing totalizer wheels under control thereof.

3. In a machine of the character described, the combination of two sets of totalizer wheels, actuating devices for simultaneously or separately introducing numbers therein, and devices which are positioned to represent a number in the nature of a multiplicand or a subtrahend, and means for placing said devices in control of either or both sets of totalizer wheels whereby a product may be registered in one of them or a number in the nature of a subtrahend subtracted from either or both sets of totalizer wheels.

4. In a machine of the character described, the combination of a set of totalizer wheels, actuating devices and pendants which are positioned to represent a number, and means for restoring said pendants to zero position independently of any operation of said actuating devices.

5. In a machine of the character described, the combination of a set of totalizer wheels, actuating devices and pendants, which latter are positioned to represent a number in the nature of a multiplicand or subtrahend, and means for clearing the totalizer wheels without restoring the pendants to zero position.

6. In a machine of the character described, the combination of multiplying plates and a subtraction plate, means for operating said plates, a printing mechanism, and means for disabling said printing mechanism whenever either the subtraction or a multiplying plate is operated.

In testimony whereof I hereunto affix my signature in the presence of two witnesses, this 13th day of August, 1913.

OTTO THIEME.

Witnesses:
M. P. SMITH,
M. A. HANDEL.